(12) United States Patent
Suzuki

(10) Patent No.: US 12,440,963 B2
(45) Date of Patent: Oct. 14, 2025

(54) SUPPORT ARM DEVICE AND ROBOT DEVICE

(71) Applicant: SONY GROUP CORPORATION, Tokyo (JP)

(72) Inventor: Hiroyuki Suzuki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/716,649

(22) PCT Filed: Nov. 4, 2022

(86) PCT No.: PCT/JP2022/041128
§ 371 (c)(1),
(2) Date: Jun. 5, 2024

(87) PCT Pub. No.: WO2023/112540
PCT Pub. Date: Jun. 22, 2023

(65) Prior Publication Data
US 2025/0033194 A1    Jan. 30, 2025

(30) Foreign Application Priority Data

Dec. 13, 2021  (JP) .................................. 2021-201495
Mar. 11, 2022  (JP) .................................. 2022-038280

(51) Int. Cl.
*B25J 9/10*  (2006.01)
*A61B 34/00*  (2016.01)
*A61F 9/007*  (2006.01)

(52) U.S. Cl.
CPC ............. *B25J 9/1065* (2013.01); *A61B 34/70* (2016.02); *A61F 9/007* (2013.01)

(58) Field of Classification Search
CPC .............................. A61B 34/70; B25J 9/1065
See application file for complete search history.

(56) References Cited

U.S. PATENT DOCUMENTS

| | | | |
|---|---|---|---|
| 6,095,011 A * | 8/2000 | Brogårdh | B25J 9/1065 |
| | | | 248/278.1 |
| 10,322,514 B2 * | 6/2019 | Vander Poorten | B25J 18/007 |
| 2015/0351857 A1 | 12/2015 | Vander et al. | |

FOREIGN PATENT DOCUMENTS

| | | | | |
|---|---|---|---|---|
| EP | 3831543 A1 * | 6/2021 | ............ | B25J 18/007 |
| FR | 2845889 A1 * | 4/2004 | ............ | B25J 9/1065 |

(Continued)

OTHER PUBLICATIONS

Machine translation of EP-3831543-A1. (Year: 2021).*

(Continued)

*Primary Examiner* — Randell J Krug
(74) *Attorney, Agent, or Firm* — CHIP LAW GROUP

(57) ABSTRACT

A support arm device (20) includes: a parallel link mechanism (21) extending in a plane direction of a first plane; and a connection mechanism (22) connected to the parallel link mechanism (21), in which the parallel link mechanism (21) includes: a support link (L89) that supports, on a distal end side, a surgical tool (T) to be inserted into a body of a patient; an opposing link (L57) facing the support link (L89); a first joint (J5) connected to a first end of the opposing link (L57); a second joint (J7) connected to a second end of the opposing link (L57); and a third joint (J1) disposed at a base, the base being an end on a side opposite to the distal end side, the third joint rotationally driven, and the connection mechanism (22) is connected between the second joint (J7) and the third joint (J1), the connection mechanism transformed in a plane direction of a second plane intersecting the first plane in such a manner that the second joint (J7) moves relative to the third joint (J1) in an extending direction of the opposing link (L57).

14 Claims, 10 Drawing Sheets

(56) References Cited

FOREIGN PATENT DOCUMENTS

| JP | 2010-099403 A | 5/2010 | |
|---|---|---|---|
| JP | 2012-091310 A | 5/2012 | |
| JP | 2012-115985 A | 6/2012 | |
| JP | 2017-064326 A | 4/2017 | |
| JP | 2021-053397 A | 4/2021 | |
| WO | 2008/108289 A1 | 9/2008 | |
| WO | 2010/117051 A1 | 10/2010 | |
| WO | WO-2017077755 A1 * | 5/2017 | ............. A61B 34/37 |

OTHER PUBLICATIONS

Machine translation of FR-2845889-A1. (Year: 2004).*
Machine translation of WO-2017077755-A1. (Year: 2017).*
International Search Report and Written Opinion of PCT Application No. PCT/JP2022/041128, issued on Jan. 10, 2023, 11 pages of ISRWO.

* cited by examiner

FIG.9
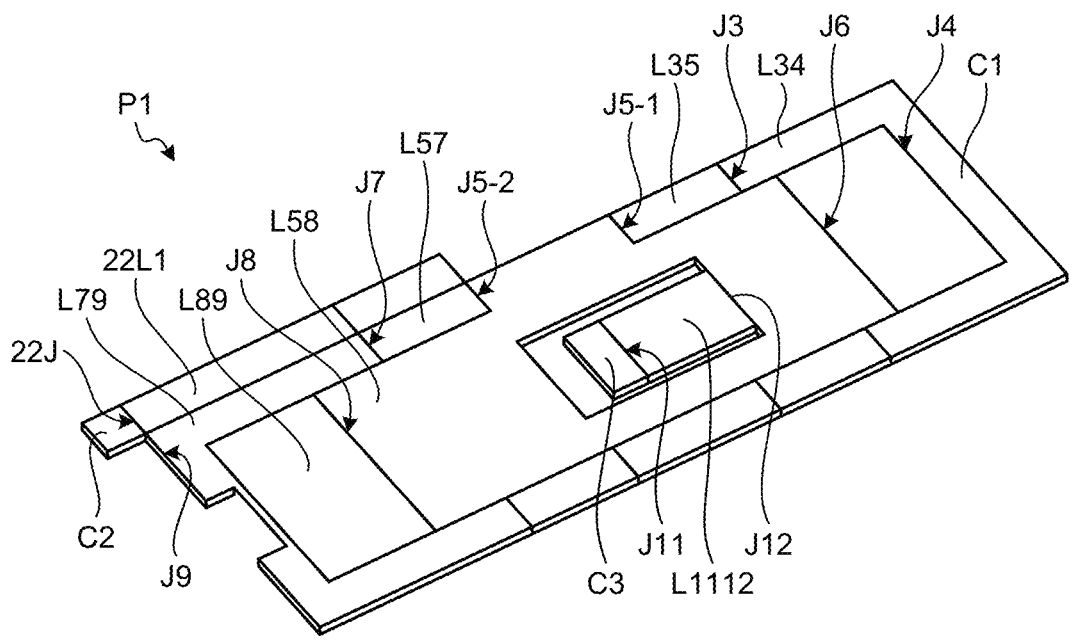
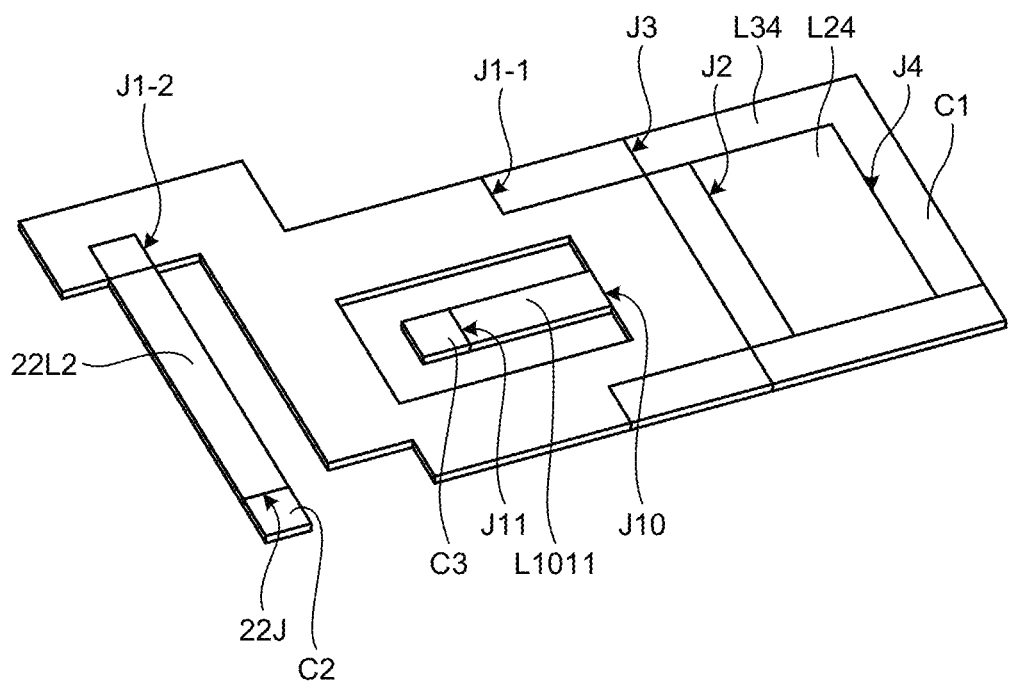

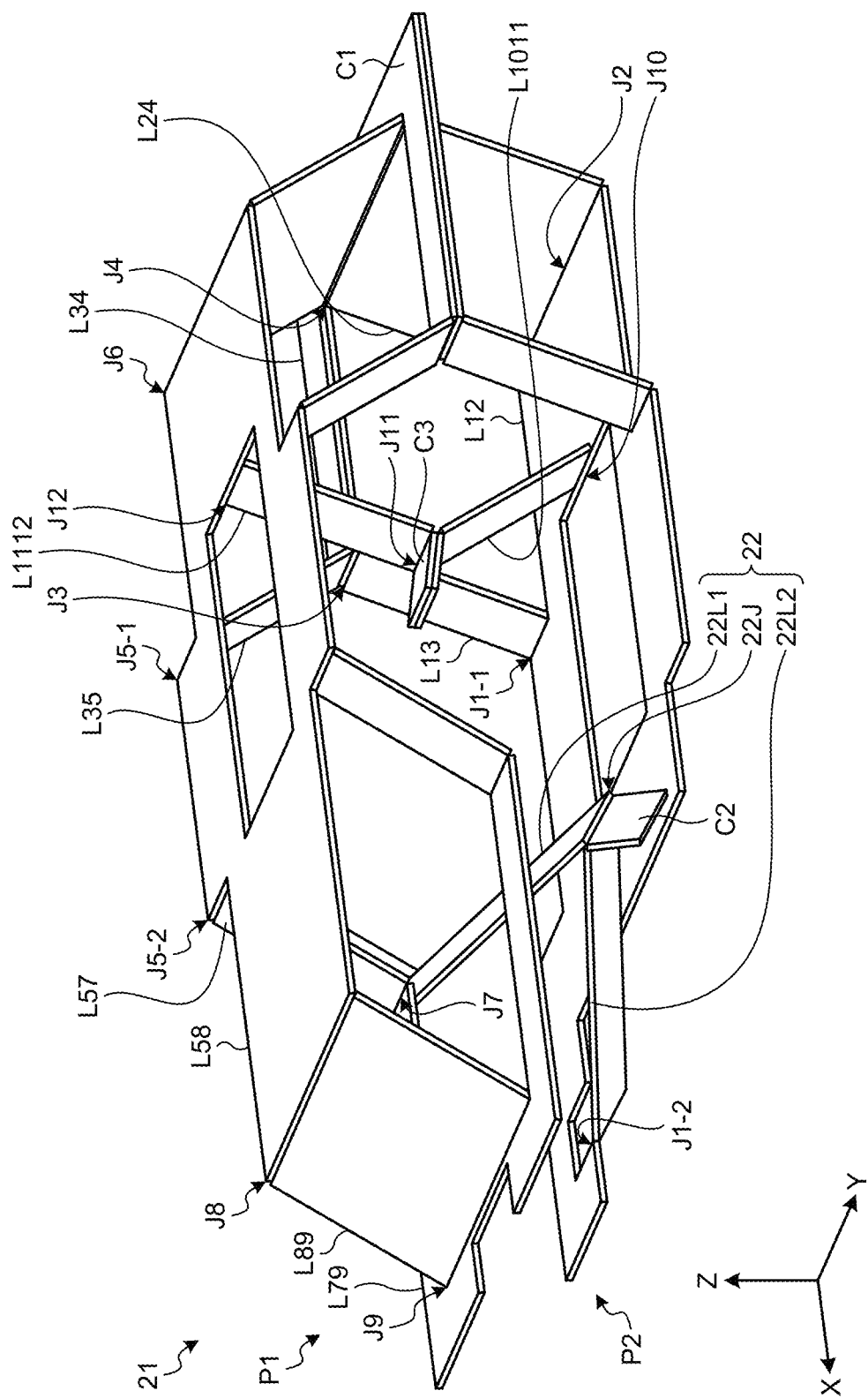

SUPPORT ARM DEVICE AND ROBOT DEVICE

CROSS REFERENCE TO RELATED APPLICATIONS

This application is a U.S. National Phase of International Patent Application No. PCT/JP2022/041128 filed on Nov. 4, 2022, which claims priority benefit of Japanese Patent Application No. JP 2021-201495 filed in the Japan Patent Office on Dec. 13, 2021, which claims priority benefit of Japanese Patent Application No. JP 2022-038280 filed in the Japan Patent Office on Mar. 11, 2022. Each of the above-referenced applications is hereby incorporated herein by reference in its entirety.

FIELD

The present disclosure relates to a support arm device and a robot device.

BACKGROUND

For example, Patent Literature 1 discloses a support arm device including a parallel link mechanism that supports a surgical tool and a slider mechanism connected to a base of the parallel link mechanism in such a manner as to be parallel to an insertion direction of the surgical tool. The slider mechanism allows the surgical tool to linearly move in the insertion direction from the base of the parallel link mechanism.

CITATION LIST

Patent Literature

Patent Literature 1: US Patent Application Publication No. 2015-0351857

SUMMARY

Technical Problem

Using a slider mechanism poses disadvantages such as large sliding friction. There is room for examination of technology that does not require a slider mechanism.

One aspect of the present disclosure provides a support arm device and a robot device capable of linearly moving a surgical tool in an insertion direction from a base of a parallel link mechanism.

Solution to Problem

A support arm device according to one aspect of the present disclosure includes: a parallel link mechanism extending in a plane direction of a first plane; and a connection mechanism connected to the parallel link mechanism, wherein the parallel link mechanism includes: a support link that supports, on a distal end side, a surgical tool to be inserted into a body of a patient; an opposing link facing the support link; a first joint connected to a first end of the opposing link; a second joint connected to a second end of the opposing link; and a third joint disposed at a base, the base being an end on a side opposite to the distal end side, the third joint rotationally driven, and the connection mechanism is connected between the second joint and the third joint, the connection mechanism transformed in a plane direction of a second plane intersecting the first plane in such a manner that the second joint moves relative to the third joint in an extending direction of the opposing link.

A robot device according to one aspect of the present disclosure includes: a first robot including a base portion and a distal end portion; and a second robot supported by the distal end portion of the first robot, the second robot supporting a surgical tool to be inserted into a body of a patient in such a manner that the surgical tool has a remote center of motion, wherein the second robot includes: a joint and a link included in a parallel link mechanism extending in a plane direction of a first plane; and a connection mechanism connected to the joint, the link includes: a support link that supports, on a distal end side, the surgical tool to be inserted into the body of the patient; and an opposing link facing the support link, the joint includes: a first joint connected to a first end of the opposing link; a second joint connected to a second end of the opposing link; and a third joint disposed at a base, the base being an end on a side opposite to the distal end side, the third joint rotationally driven, and the connection mechanism is connected between the second joint and the third joint, the connection mechanism transformed in a plane direction of a second plane intersecting the first plane in such a manner that the second joint moves relative to the third joint in an extending direction of the opposing link.

BRIEF DESCRIPTION OF DRAWINGS

FIG. 9 is a diagram illustrating an example of assembly of the parallel link mechanism 21 and the connection mechanism 22.

FIG. 10 is a diagram illustrating an example of a schematic structure of the parallel link mechanism 21 and connection mechanism 22 that are assembled.

DESCRIPTION OF EMBODIMENTS

Hereinafter, embodiments of the present disclosure will be described in detail on the basis of the drawings. Note that in each of the following embodiments, the same elements are denoted by the same symbols, and redundant description will be omitted.

The present disclosure will be described in the following order of items.

0. Introduction
1. Embodiment
2. Modifications
3. Application Example to Robot Device
4. Exemplary Effects
5. Modifications
6. Exemplary Effects

0. INTRODUCTION

In minimally invasive surgery using a support arm device, a remote center of motion (RCM) on a distal end side is an element necessary for stationing an insertion point of a surgical tool into the body. For example, a mechanical RCM (parallel link type RCM) using a parallel link mechanism is known. There are features that it is easy for an operator to intuitively understand the position, which helps setting or that a wide range of motion can be obtained. However, if many mechanical parts are arranged in the vicinity (namely, in the vicinity of a patient) in order to linearly move the surgical tool in an insertion direction, the risk of physical interference among the patient, the surgical tool, and others increases. There is also a disadvantage that inertia increases due to complication of electrical wiring at the distal end, an increase in size of mechanical components, and the like.

In order to linearly move the surgical tool in the insertion direction from the base of the parallel link mechanism, there is technology using a slider mechanism as in Patent Literature 1 described above. However, using a slider mechanism poses disadvantages such as large sliding friction, complication of the mechanism, and difficulty in downsizing (thickness reduction in the thickness direction or others), leading to large inertia. Such disadvantages are addressed by the disclosed technology. According to the disclosed technology, it is possible to linearly move the surgical tool in the insertion direction from the base of the parallel link mechanism without using a slider mechanism.

1. EMBODIMENT

Figure 1:
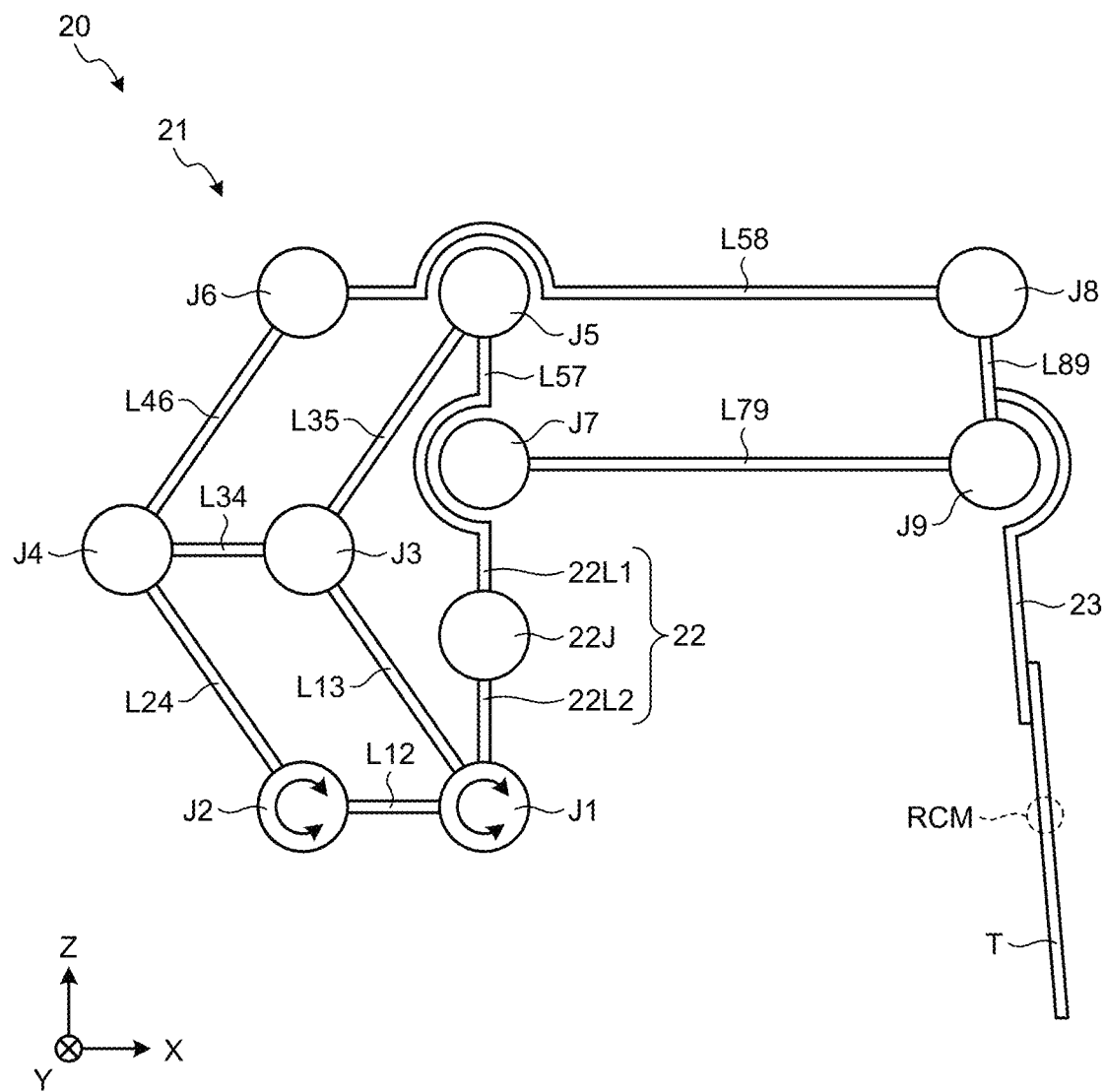
FIG. 1 is a diagram schematically illustrating an example of a schematic structure of a support arm device 20 according to an embodiment.
Figure 2:
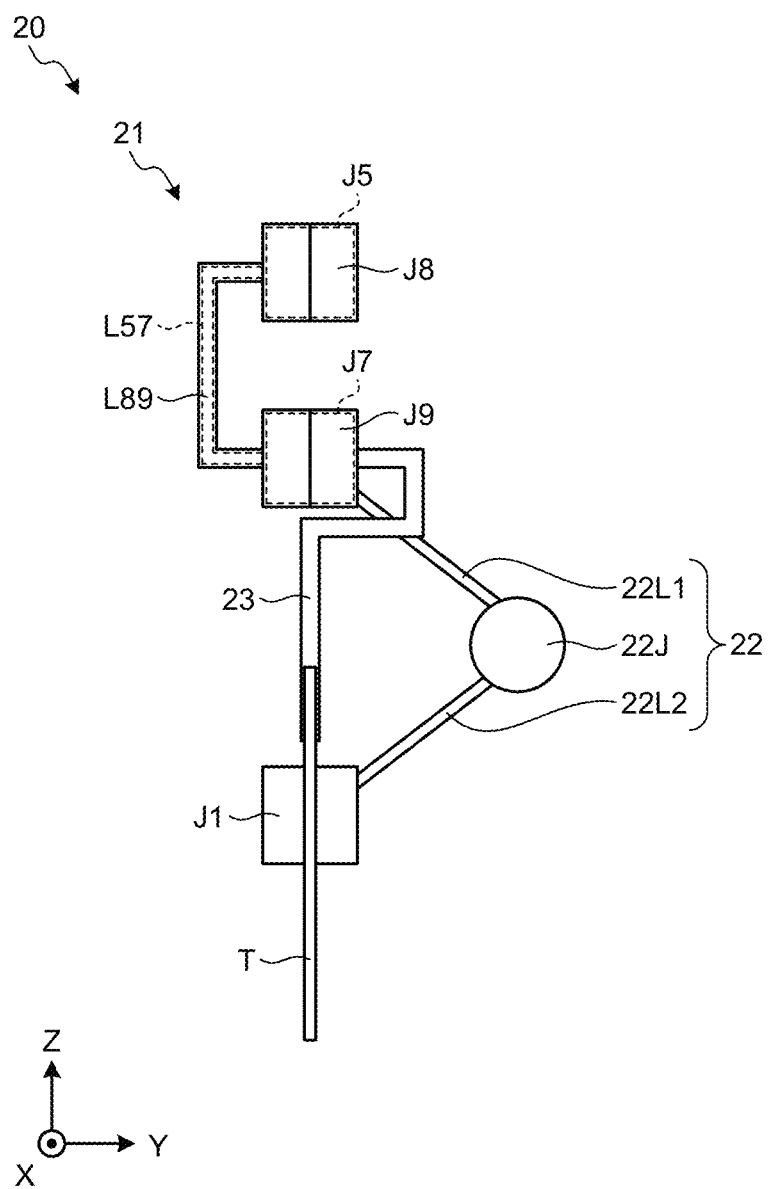
FIG. 2 is a diagram schematically illustrating an example of a schematic structure of the support arm device 20 according to the embodiment.

FIGS. 1 and 2 are diagrams schematically illustrating an example of a schematic structure of a support arm device 20 according to an embodiment. In FIG. 1, an XYZ coordinate system is illustrated. The X-axis direction, the Y-axis direction, and the Z-axis direction correspond to a front-rear direction, a lateral direction, and an up-down direction of the support arm device 20. In FIG. 1, a schematic structure of the support arm device 20 as viewed from a side (in the Y-axis positive direction) is schematically illustrated. In FIG. 2, some elements of the support arm device 20 as viewed from the front (in the X-axis negative direction) are schematically illustrated. An element indicated by a broken line is positioned behind an element indicated by a solid line (on the X-axis negative direction side).

As illustrated in FIG. 1, the support arm device 20 supports a surgical tool T on the distal end side (X-axis positive direction side). The support arm device 20 includes a parallel link mechanism 21, a connection mechanism 22, and a support member 23.

The parallel link mechanism 21 extends in the XZ plane direction (plane direction of a first plane). That is, the parallel link mechanism 21 has two degrees of freedom of a degree of freedom in the X-axis direction and a degree of freedom in the Z-axis direction. There is no degree of freedom in the Y-axis direction.

The parallel link mechanism 21 includes a plurality of joints and a plurality of links. In FIG. 1, joints J1 to J9 are illustrated as the plurality of joints of the parallel link mechanism 21. Among them, the joint J1 and the joint J2 are arranged at the base of the parallel link mechanism 21 (of the support arm device 20). The base of the parallel link mechanism 21 is an end on the opposite side to the distal end side of the parallel link mechanism 21. The joint J1 and the joint J2 are rotationally driven by an actuator (not illustrated) or the like. Mechanical parts such as the actuator are intensively arranged at the base of the parallel link mechanism 21.

Each of the plurality of links extends in the XZ plane direction and is connected between joints. In the example illustrated in FIG. 1, a link L12 is connected between the joint J1 and the joint J2. A link L13 is connected between the joint J1 and the joint J3. A link L24 is connected between the joint J2 and the joint J4. A link L34 is connected between the joint J3 and the joint J4. A link L35 is connected between the joint J3 and the joint J5. A link L46 is connected between the joint J4 and the joint J6. A link L57 is connected between the joint J5 and the joint J7. A link L58 is connected between the joint J5 and the joint J8. A link L79 is connected between the joint J7 and the joint J9. A link L89 is connected between the joint J8 and the joint J9.

Note that, in FIG. 1, portions of some links positioned at positions different from other elements in the Y-axis direction are drawn in such a manner as to bypass a joint instead of crossing the joint.

The parallel link mechanism 21 includes three parallel link mechanisms including a parallel link mechanism positioned on the base side, a parallel link mechanism positioned on the distal end side, and a parallel link mechanism connected therebetween. The parallel link mechanism positioned on the base side includes the joints J1 to J4, the link L12, the link L13, the link L24, and the link L34. The parallel link mechanism positioned on the distal end side includes the joint J5, joints J7 to J9, the link L57, the link L58, the link L79, and the link L89. The parallel link mechanism connected between them includes the joints J3 to J6, the link L34, the link L35, the link L46, and the link L58.

The operation of the illustrated parallel link mechanism 21 itself will be understood by those skilled in the art, and thus several characteristic portions of the parallel link mechanism 21 will be described below.

The link L89 is a link (support link) that supports the surgical tool T on the distal end side. In this example, the link L89 is connected to the surgical tool T via the support member 23 and supports the surgical tool T. The link L89, the support member 23, and the surgical tool T extend in the insertion direction of the surgical tool T into the body. The link L57 is a link (opposing link) facing the link L89 and extends in the insertion direction of the surgical tool T similarly to the link L89. In the insertion direction of the surgical tool T, the surgical tool T, the link L89, and the link L57 move together in parallel.

The joint J5 is a joint (first joint) connected to a first end of the link L57. The joint J7 is a joint (second joint) connected to a second end of the link L57.

As described above, the joint J1 is a joint (third joint) that is disposed at the base of the parallel link mechanism 21 together with the joint J2 and is rotationally driven. By rotating the joint J1 and the joint J2, the surgical tool T can be moved in the XZ plane direction from the base of the parallel link mechanism 21. For example, the surgical tool T can be pivoted or moved in the insertion direction by rotation from the base.

The support arm device 20 supports the surgical tool T in such a manner that the surgical tool T has a remote center of motion RCM (fixed point in pivot rotation). Specifically, the support arm device 20 supports the surgical tool T in such a manner that an intersection between a straight line connecting the joint J1 and the joint J2 and the surgical tool T is set to the remote center of motion RCM. In the example illustrated in FIG. 1, the remote center of motion RCM of the surgical tool T is positioned at the same position as the joint J1 and the joint J2 in the Z-axis direction.

The connection mechanism 22 is connected to joints of the parallel link mechanism 21 in such a manner as to linearly move the surgical tool T in the insertion direction from the base of the parallel link mechanism 21. In this example, the connection mechanism 22 is connected between the joint J7 and the joint J1. The connection mechanism 22 is transformed in the plane direction of a second plane intersecting an XZ plane in such a manner that the joint J7 moves relative to the joint J1 in the extending direction of the link L57 (namely, the insertion direction of the surgical tool T). Hereinafter, unless otherwise specified, it is based on the premise that the second plane is also a YZ plane orthogonal to an XZ plane.

The connection mechanism 22 is transformed on the YZ plane in such a manner that the joint J5, the joint J7, the joint J1, and the connection mechanism 22 are positioned on the YZ plane. That is, the connection mechanism 22 is transformed in such a manner that the YZ plane passing through the joint J5, the joint J7, and the joint J1 is restrained.

In one embodiment, the connection mechanism 22 includes a link mechanism that pivots on the YZ plane. The surgical tool T moves in the insertion direction as the connection mechanism 22 is transformed. The movement amount of the surgical tool T also changes in correspondence to the transformation amount of the connection mechanism 22.

In the example illustrated in FIGS. 1 and 2, as particularly illustrated in FIG. 2, the connection mechanism 22 includes a link mechanism that is transformed to have a V-shape on the YZ plane. Examples of elements of the link mechanism of the connection mechanism 22 include a joint 22J, a link 22L1, and a link 22L2. The link 22L1, the joint 22J, and the link 22L2 are connected in this order between the joint J7 and the joint J1.

As the joint 22J moves away from the joint J1 and the joint J7, the joint J7 moves to approach the joint J1. In the example illustrated in FIG. 2, as the joint J2 advances in the Y-axis positive direction, the joint J7 moves downward, namely, in the insertion advancing direction of the surgical tool T. The link L57 and the joint J5 also move in the same direction together with the joint J7, and the link L89 facing the link L57 also moves in the same direction. The surgical tool T supported by the link L89 via the support member 23 moves in the insertion advancing direction.

Conversely, as the joint 22J approaches the joint J1 and the joint J7, the joint J7 moves away from the joint J1. In the example illustrated in FIG. 2, as the joint J2 advances in the Y-axis negative direction, the joint J7 moves upward, namely, in the insertion retraction direction of the surgical tool T. The link L57 and the joint J5 also move in the same direction together with the joint J7, and the link L89 facing the link L57 also moves in the same direction. The surgical tool T supported by the link L89 via the support member 23 moves in the insertion retraction direction.

For example, by using transformation of the connection mechanism 22 as described above, the joint J7 and the link L57 can be moved in parallel with the insertion direction of the surgical tool T. As a result, the surgical tool T can be linearly moved in the insertion direction from the base of the parallel link mechanism 21.

As described above, since the parallel link mechanism 21 has no degree of freedom in the Y-axis direction, the joint J5, the joint J7, and the joint J1 do not move in the Y-axis direction even when the connection mechanism 22 is transformed. In addition, since the connection mechanism 22 is transformed not on the XZ plane but on the YZ plane, the joint J5, the joint J7, and the joint J1 do not move in the X-axis direction even when the connection mechanism 22 is transformed. As a result, the three joints of the joint J5, the joint J7, and the joint J1 pass on the same straight line in plan view on the XZ plane, and the joint J5, the joint J7, the joint J1, and the connection mechanism 22 are positioned on the YZ plane. With this condition satisfied, the intersection between the straight line connecting the joint J1 and the joint J2 and the surgical tool T is set as the remote center of motion RCM.

According to the support arm device 20 described above, the surgical tool T can be linearly moved in the insertion direction from the base of the parallel link mechanism 21 in which the rotationally driven joint J1 is disposed by using the transformation of the connection mechanism 22. For example, the disadvantages that may occur by using a slider mechanism as described in Patent Literature 1 are solved. No large sliding friction is generated as in a slider mechanism. There is also an enhanced possibility of simplifying the structure, facilitating downsizing, or reducing inertia.

In addition, the support arm device 20 can be made compact by folding the connection mechanism 22 (in the above case, the link mechanism thereof). Furthermore, the movable range in the insertion direction of the surgical tool T can be easily expanded as compared with the case of using a slider mechanism. This is because, in the case of a slider mechanism, it is necessary to take measures such as lengthening the slider; however, this difficult in many cases due to size restriction or others.

2. MODIFICATIONS

The technology disclosed is not limited to the above embodiment. The connection mechanism 22 is not limited to the above structure. Some variations of the connection mechanism 22 will be described with reference to FIGS. 3 to 5.

Figure 3:
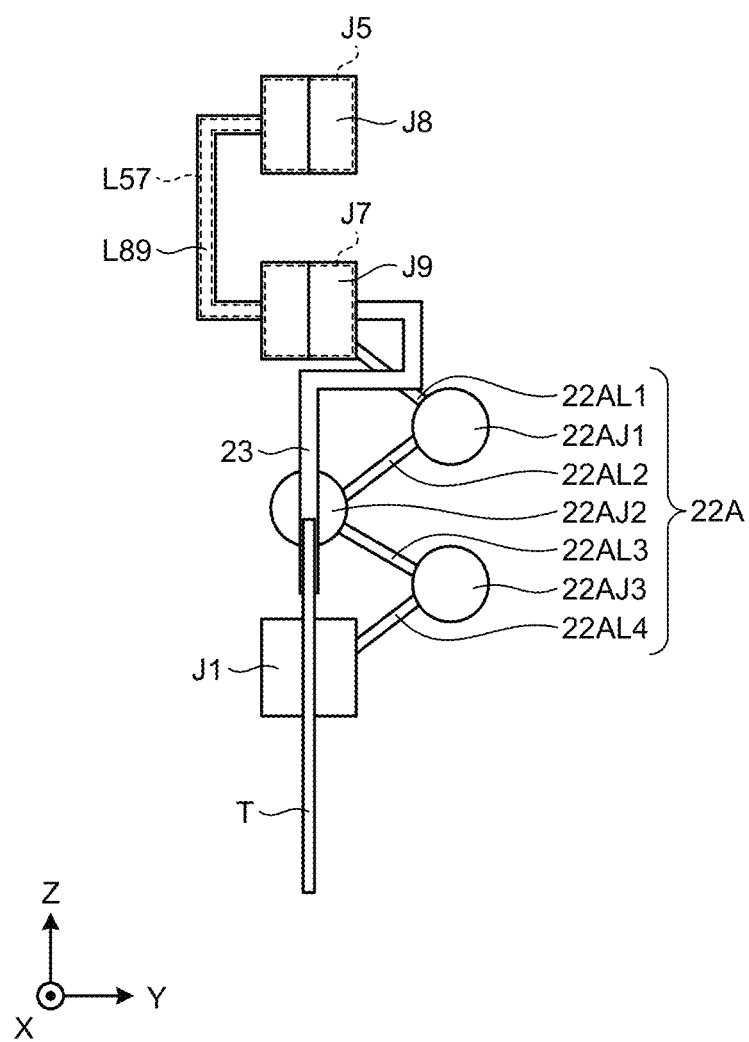
FIG. 3 is a diagram schematically illustrating an example of a schematic structure of a connection mechanism 22A according to a modification.

FIG. 3 is a diagram schematically illustrating an example of a schematic structure of a connection mechanism 22A according to a modification. The illustrated connection mechanism 22A includes a link mechanism that is transformed to have a plurality of V-shapes on the YZ plane. Examples of elements of the link mechanism of the connection mechanism 22A include a joint 22AJ1, a joint 22AJ2, a joint 22AJ3, a link 22AL1, a link 22AL2, a link 22AL3, and a link 22AL4. The link 22AL1, the joint 22AJ1, the link 22AL2, the joint 22AJ2, the link 22AL3, the joint 22AJ3, and the link 22AL4 are connected in this order between the joint J7 and the joint J1.

In the Z-axis direction, the joints positioned on the Y-axis positive direction side and the joint positioned on the Y-axis negative direction side are alternately arranged. In this example, among the joint 22AJ1, the joint 22AJ2, and the joint 22AJ3, the joint 22AJ1 and the joint 22AJ3 are positioned on the Y-axis positive direction side. The joint 22AJ2 is positioned on the Y-axis negative direction side. With such joints and links, transformation to have the plurality of V-shapes is made possible. It is made possible to fold more compactly than in the case of transformation to have the one V-shape (FIG. 2). The possibility of further expanding the movable range is also increased.

Figure 4:
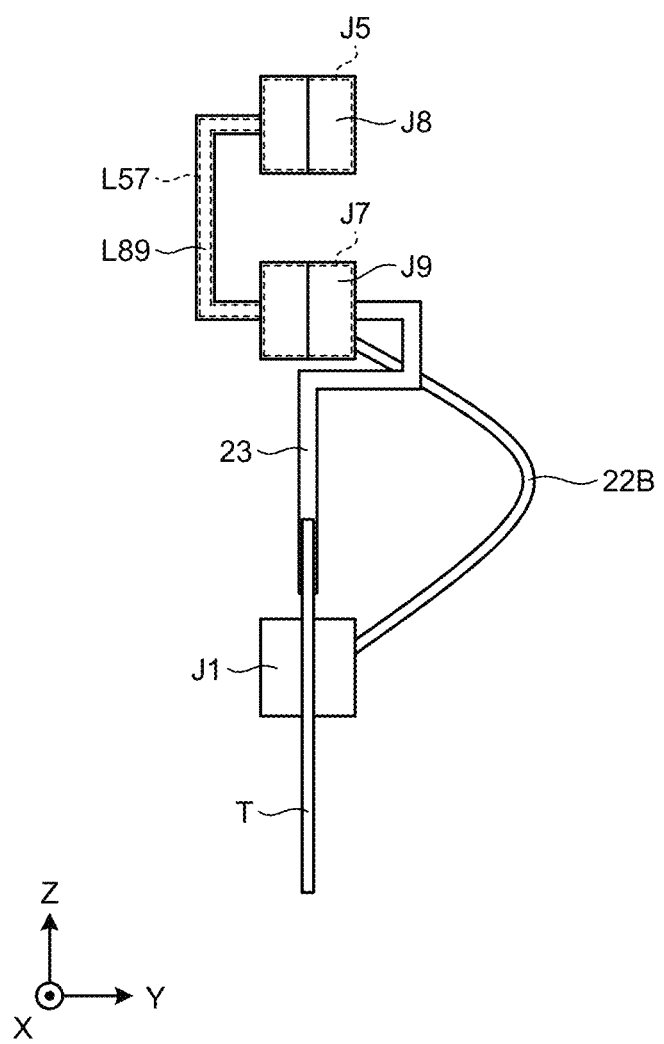
FIG. 4 is a diagram schematically illustrating an example of a schematic structure of a connection mechanism 22B according to a modification.

FIG. 4 is a diagram schematically illustrating an example of a schematic structure of a connection mechanism 22B according to a modification. The illustrated connection mechanism 22B includes an elastic body that is elastically transformed on the ZY plane. An example of the elastic body is a leaf spring or the like. The connection mechanism 22B includes a leaf spring that is transformed to have a U-shape on the ZY plane. The connection mechanism 22B also functions similarly to the connection mechanism 22 (FIG. 2) and the connection mechanism 22A (FIG. 3) described above.

Figure 5:
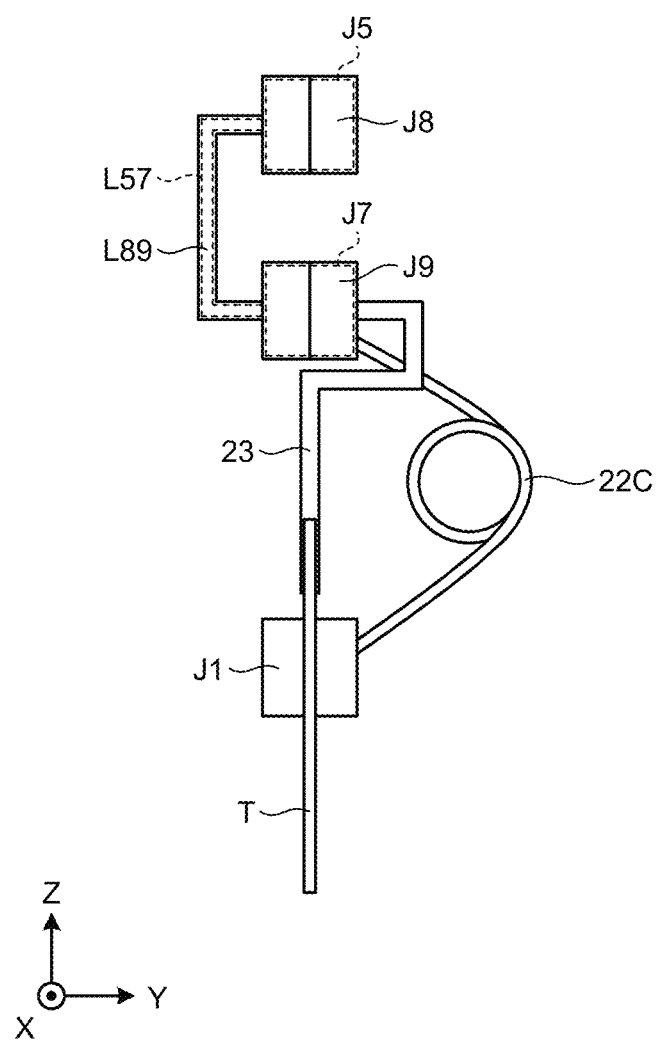
FIG. 5 is a diagram schematically illustrating an example of a schematic structure of a connection mechanism 22C according to a modification.

FIG. 5 is a diagram schematically illustrating an example of a schematic structure of a connection mechanism 22C according to a modification. The illustrated connection mechanism 22C includes an elastic body that is transformed in such a manner as to spiral one or more times on the YZ plane. The connection mechanism 22C also functions similarly to the connection mechanism 22 (FIG. 2) and the connection mechanism 22A (FIG. 3) described above. Note that the elastic body may be transformed in such a manner as to be wound or unwound on the YZ plane.

In the above embodiment, the case where the second plane intersecting the XZ plane (first plane) is the YZ plane orthogonal to the XY plane has been described as an example. However, the second plane may not be orthogonal to the XY plane. Various planes other than the XY plane may be the second plane.

3. APPLICATION EXAMPLE TO ROBOT DEVICE

The support arm device 20 may be applied to a robot device. This will be described with reference to FIG. 6.

Figure 6:
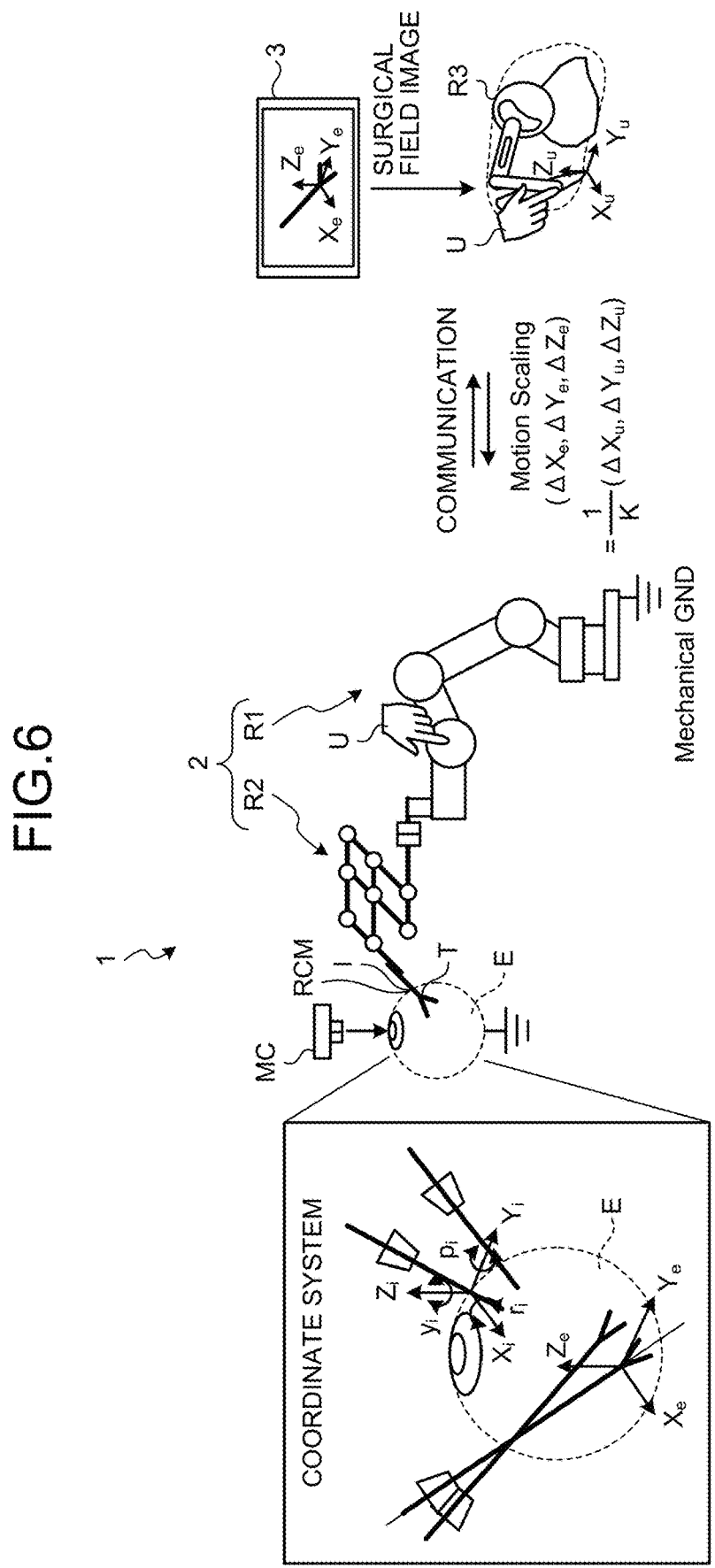
FIG. 6 is a diagram illustrating an example of a schematic structure of a robot system 1 including a robot device 2.

FIG. 6 is a diagram illustrating an example of a schematic structure of a robot system 1 including a robot device 2. The robot system 1 is used for surgery. Hereinafter, a case where the surgery is ophthalmic surgery will be described as an example. An eyeball of a patient to be operated is referred to as an eyeball E in the drawing. An operator (doctor or the like) is referred to as a user U in the drawing. In FIG. 1, a hand of the user U is schematically illustrated.

The robot system 1 includes the robot device 2, a microscope MC, a monitor 3, and a robot R3. Describing the microscope MC and the monitor 3 first, the microscope MC observes a surgical field. The field of vision of the microscope MC may include the eyeball E, a surgical tool T in the eyeball E, and others. The monitor 3 displays an observation image (surgical field image) of the microscope MC. The user U observes the surgical field by viewing the observation image of the microscope MC displayed on the monitor 3 or directly viewing from an eyepiece of the microscope MC. An operation using the visual feedback of a relative positional relationship between the surgical tool T captured in the surgical field and the robot device 2 at hand allows the surgery to proceed.

The robot device 2 is a robot (patient-side robot) disposed near a patient and includes two robots connected in series to each other. A first robot is referred to as a robot R1 in the drawing. A second robot is referred to as a robot R2 in the drawing. The robot R1 is positioned farther from the patient than the robot R2 is. The robot R2 is supported by the robot R1 in such a manner as to be positioned closer to the patient than the robot R1 is. The robot device 2 can also be referred to as a robot arm device or the like. A base position (base plane) serving as a reference of the spatial coordinates of the robot device 2 is schematically illustrated as Mechanical GND.

The robot R1 may not include an actuator, a motor, a force sensor, or the like. In this case, the robot R1 may be configured to be operated by the user U by directly applying a force. The operation of the robot R1 by the user U is also referred to as manual operation of the robot R1. For example, the user U grips and moves the robot R1 to manually operate the robot R1.

The robot R1 has three or more degrees of freedom. In this example, the robot R1 has three degrees of freedom of translation and three degrees of freedom of rotation. In FIG. 1, the translation axes of the robot R1 are indicated as an Xi axis, a Yi axis, and a Zi axis. The rotation axes of the robot R1 are indicated as an ri axis, a pi axis, and a yi axis. By allowing the robot R1 to have many degrees of freedom, it becomes easy to move the robot R1 to a desired position or to make the robot R1 take a desired attitude.

The robot R2 is configured in such a manner that the user U can operate the robot R2 without directly applying a force. The robot R2 includes an actuator and others. For example, the robot R2 is configured to proactively move in accordance with a displacement amount of the robot R3 provided at a position away from the robot R2. The user U remotely operates the robot R2 by operating the robot R3.

As the robot R2, the support arm device 20 described above may be used. As illustrated, the robot R2 supports the surgical tool T. In this example, the surgical tool T is inserted into the eyeball E. The robot R2 supports the surgical tool T in such a manner that the surgical tool T has the remote center of motion RCM. A pivot point (pivot position) of a parallel link mechanism of the robot R2 serves as the remote center of motion RCM.

The robot R2 has one or more degrees of freedom. In this example, the robot R2 has three degrees of freedom and is pivotally movable. In FIG. 1, pivot rotation axes of the robot R2 are indicated as an Xe axis, a Ye axis, and a Ze axis. The robot R2 moves the surgical tool T in the eyeball E about the remote center of motion RCM as a rotation center.

Since the robot R2 is caused to move by a precise actuator or the like, it can perform operation with higher accuracy (for example, about 10 μm) than that of the robot R1 that can be manually operated. In this sense, the robot R1 can be referred to as a rough movement robot, and the robot R2 can be referred to as a fine movement robot. Note that a drape for covering a clean region may be fixed to the robot R1.

The user U manually moves the robot R1 in such a manner as to insert the surgical tool T into the eyeball E. An insertion position of the surgical tool T in the eyeball E is referred to as an insertion point I in the drawing. The user U manually moves the robot R1 to align the insertion point I with the remote center of motion RCM. As illustrated in FIG. 1, the surgery is carried out in a state where the insertion point I of the surgical tool T and the remote center of motion RCM overlap with each other (are at the same position).

The robot R2 is configured to be remotely operable. In the example illustrated in FIG. 1, as described above, the user U remotely operates the robot R2 by operating the robot R3. The axes of the robot R3 corresponding to the robot R2 are illustrated as an Xu axis, a Yu axis, and a Zu axis. The robot R2 and the robot R3 are, for example, bilaterally controlled in such a manner that displacement amounts and forces in the robots R2 and R3 correspond to each other by using bidirectional communication.

Scaling of the relative positional relationship may be performed between the robot R2 and the robot R3. In the example illustrated in FIG. 1, motion scaling is used in such a manner that the physical displacement amount of the robot R2 becomes smaller than the physical displacement amount of the robot R3 (1/K times). This enables fine remote operation of the robot R2 via the robot R3, thereby facilitating remote surgery.

Note that the user U who operates the robot R1 of the robot device 2 and the user U who operates the robot R3 may be the same or different.

For example, the support arm device 20 described above is used for the robot R2 of the robot device 2 described above. Note that the coordinate system regarding the robot R2 illustrated in FIG. 6 may be defined separately from the coordinate system regarding the support arm device 20 illustrated in FIGS. 1 to 5 described above.

4. EXEMPLARY EFFECTS

The technology described above is specified as follows, for example. One piece of the disclosed technology is the support arm device 20. As described with reference to FIGS. 1, 2, 6, and others, the support arm device 20 includes the parallel link mechanism 21 extending in the plane direction (XZ plane direction) of the first plane and the connection mechanism 22 connected to the parallel link mechanism 21. The parallel link mechanism 21 includes the link L89 (support link) that supports the surgical tool T to be inserted into the body of a patient (for example, into the eyeball E) on the distal end side (for example, the X-axis positive direction side), the link L57 (opposing link) facing the link L89, the joint J5 (first joint) connected to the first end of the link L57, the joint J7 (second joint) connected to the second end of the link L57, and the joint J1 (third joint) disposed at the base that is an end on the opposite side of the distal end side and rotationally driven. The connection mechanism 22 is connected between the joint J7 and the joint J1 and is transformed in a plane direction (for example, the YZ plane direction orthogonal to the XZ plane) of the second plane intersecting the first plane in such a manner that the joint J7 moves relative to the joint J1 in the extending direction of the link L57 (namely, a direction parallel to the insertion direction of the surgical tool T).

According to the support arm device 20 described above, the surgical tool T can be linearly moved in the insertion direction from the base of the parallel link mechanism 21 in which the rotationally driven joint J1 is disposed by using the transformation of the connection mechanism 22. This solves disadvantages that may occur by using a slider mechanism, for example.

As described with reference to FIG. 1, FIG. 2, and others, the connection mechanism 22 may be transformed on the second plane in such a manner that the joint J5, the joint J7, and the joint J1 are positioned on the second plane (for example, on the YZ plane). As a result, the second plane passing through the joint J5, the joint J7, and the joint J1 can be restrained, and the intersection between the straight line connecting the joint J1 and the joint J2 and the surgical tool T can be set as the remote center of motion RCM.

As described with reference to FIG. 2, FIG. 3, and others, the connection mechanism 22 and the connection mechanism 22A may include the link mechanism that rotates on the second plane (for example, on the YZ plane). The connection mechanism 22 or the connection mechanism 22B may be transformed to have one or more V-shapes on the second plane. The support arm device 20 can be made compact by folding the connection mechanism 22 or the connection mechanism 22B. Furthermore, the movable range in the insertion direction of the surgical tool T can be expanded more than the case of using a slider mechanism.

As described with reference to FIG. 4, FIG. 5, and others, the connection mechanism 22B and the connection mechanism 22C may include the elastic body (for example, a leaf spring) that is elastically transformed on the second plane (for example, on the YZ plane). The elastic body may be transformed in such a manner as to have a U-shape or to spiral one or more times on the second plane. The connection mechanism 22B and the connection mechanism 22C as described above also function similarly to the connection mechanism 22 described above.

The robot device 2 described with reference to FIG. 6 and others is also one piece of the disclosed technology. The robot device 2 includes the robot R1 (first robot) and the robot R2 (second robot). The robot R1 includes a base portion 4 and a distal end portion 5. The robot R2 is supported by the distal end portion 5 of the robot R1 and supports the surgical tool T in such a manner that the surgical tool T to be inserted into the body of the patient (for example, into the eyeball E) has the remote center of motion RCM. The robot R2 is the support arm device 20 described above. Also with such a robot device 2, as described above, the surgical tool T can be linearly moved in the insertion direction from the base of the parallel link mechanism 21.

5. MODIFICATIONS

The parallel link mechanism 21 and connection mechanism 22 can also be assembled in an origami fashion. Such a modification will be described with reference to FIGS. 7 to 10.

Figure 7:
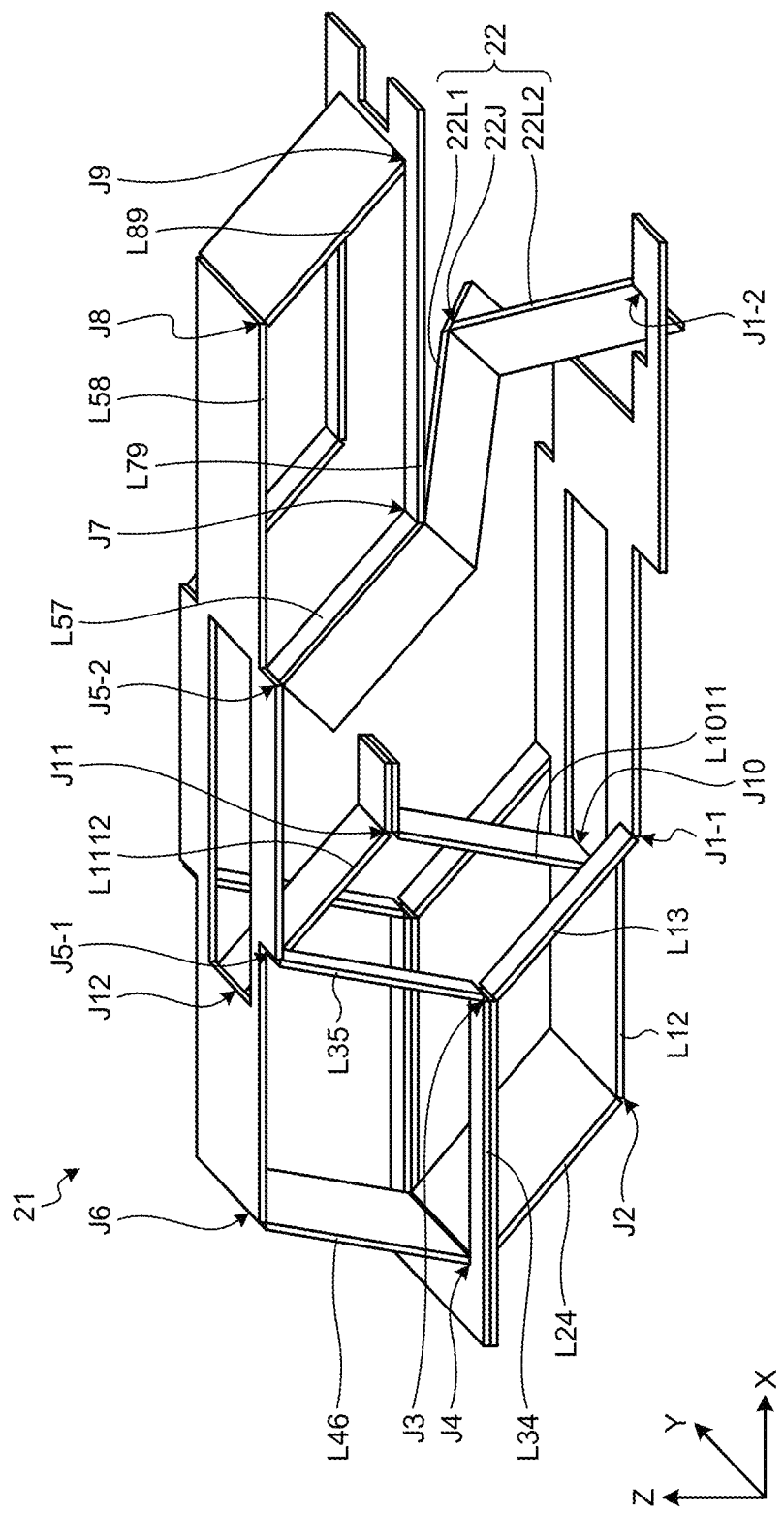
FIG. 7 is a diagram illustrating an example of a schematic structure of a parallel link mechanism 21 and a connection mechanism 22 according to a modification.
Figure 8:
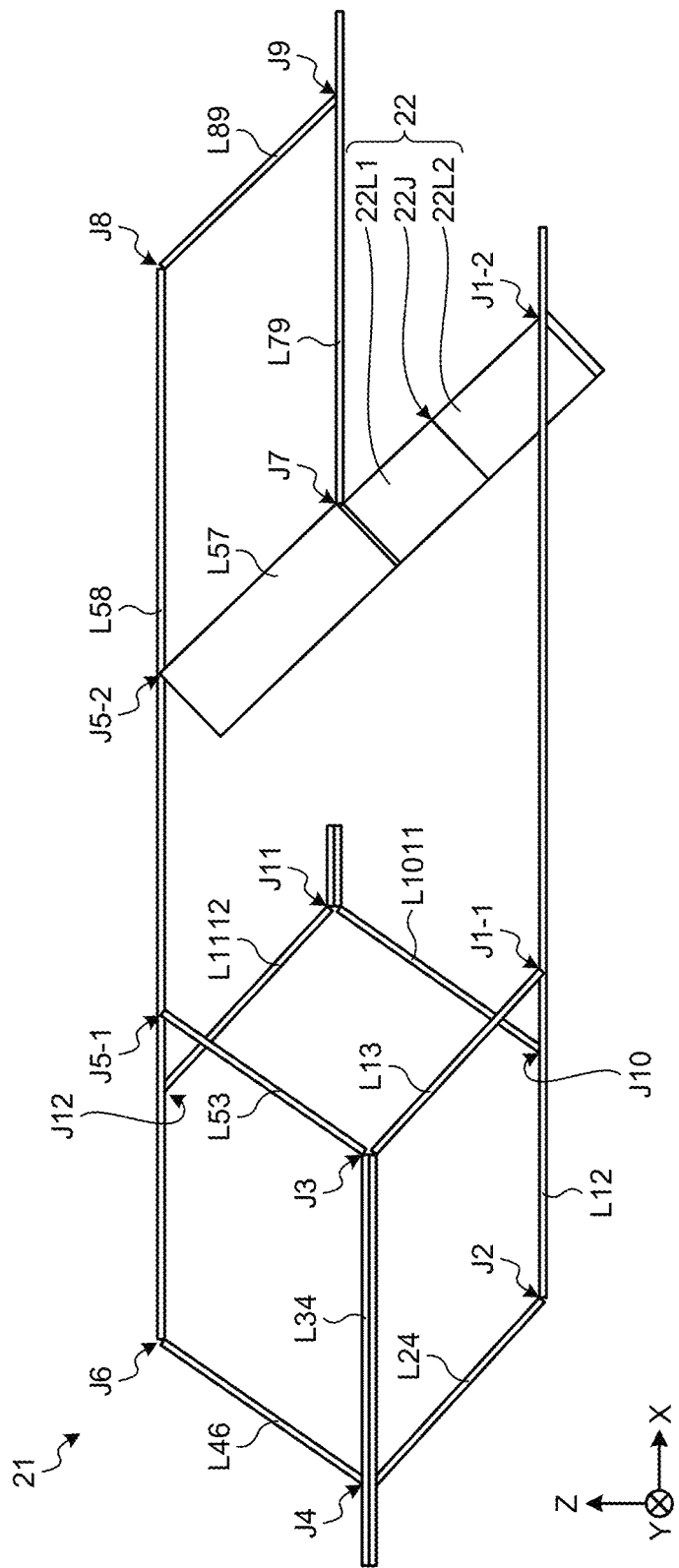
FIG. 8 is a diagram illustrating an example of the schematic structure of the parallel link mechanism 21 and the connection mechanism 22 according to the modification.

FIGS. 7 and 8 are diagrams illustrating an example of a schematic structure of a parallel link mechanism 21 and a connection mechanism 22 according to the modification. The parallel link mechanism 21 and the connection mechanism 22 are structured using a bendable plate-shaped member in such a manner as to have a hinge structure. A bent portion in the plate-shaped member functions as a joint. A portion connecting bent portions functions as a link. Hereinafter, a portion corresponding to a joint in the plate-shaped member is also simply referred to as a joint portion or the like. A portion corresponding to a link in the plate-shaped member is also simply referred to as a link portion or the like.

A joint portion of the plate-shaped member has flexibility and is elastically transformable (for example, has a hinge structure). A joint portion is softer than a link portion. In other words, a link portion has higher rigidity than that of a joint portion.

For example, the thickness of a joint portion may be less than the thickness of a link portion. The joint portions may have one or more holes (micropores). With a thin thickness or holes included, the joint portions are softer than the link portions and are easily bent.

Examples of the material of the plate-shaped member include carbon, iron, and others. In an embodiment, the plate-shaped member may be made of a composite material. In this case, different materials may be used for joint portions and link portions. A joint portion is made of a material softer than that of a link portion (for example, a material having a different Young's modulus or the like). Examples of such a material of the joint portions include polyimide, rubber, silicone, elastomer, and the like.

In this example, a joint J1 includes a joint J1-1 and a joint J1-2 positioned at different positions in the X-axis direction. The joint J1-2 is positioned on a side opposite to the joint J1 across the joint J1-1. The joint J1-1 and a joint J2 are drive axes, and an intersection between a straight line connecting the joint J1-1 and the joint J2 and a surgical tool T (FIG. 1) is set as the fixed point RCM. A connection mechanism 22 is connected between the joint J1-2 and a joint J7. The position of the joint J1-1 may be any position between the joint J1-2 and the joint J2.

In this example, the joint J5 is constituted by a joint J5-1 and a joint J5-2 positioned at different positions in the X-axis direction. The joint J5-2 is positioned on the side opposite to a joint J6 across the joint J5-1. The joint J5-2 is a joint (first joint) connected to a first end of the link L57. As described above, a link L57 is a link (opposing link) facing a link L89 and moves in parallel to and together with the link L89. The position of the joint J5-1 may be any position between the joint J5-2 and the joint J6.

A portion between the joint J1-2 in the parallel link mechanism 21 and the joint J2 and a portion between the joint J5-2 and the joint J6 are connected. As elements used for this connection, a joint J10, a joint J11, a joint J12, a link L1011, and a link L1112 are indicated as an example.

The joint J10 is provided between the joint J12-1 and the joint J2. The joint J12 is provided between the joint J5-2 and the joint J6. The link L1011, the joint J10, and the link L1112 are connected in this order between the joint J11 and the joint J12. These elements are provided from the viewpoint of bonding plate-shaped members described later and do not hinder movement of the parallel link mechanism 21.

The plate-shaped members forming the parallel link mechanism 21 and the connection mechanism 22 are a plurality of plate-shaped members partially bonded to each other. As an example, a structure in which the parallel link mechanism 21 and the connection mechanism 22 are assembled by bonding two plate-shaped members will be described with reference to FIGS. 9 and 10.

FIG. 9 is a diagram illustrating an example of assembly of the parallel link mechanism 21 and the connection mechanism 22. Two plate-shaped members of a plate-shaped member P1 and a plate-shaped member P2 are used. The plate-shaped member P1 corresponds to an upper side (Z-axis positive direction side) portion of the parallel link mechanism 21 and the connection mechanism 22. The plate-shaped member P2 corresponds to a lower side (Z-axis negative direction side) portion of the parallel link mechanism 21 and the connection mechanism 22. The joints and links corresponding to the plate-shaped member P1 and the plate-shaped member P2 are as indicated by reference numerals in FIG. 9.

Each of the plate-shaped member P1 and the plate-shaped member P2 includes a bonding portion C1, a bonding portion C2, and a bonding portion C3. A bonding portion C1 is connected to a joint J4. A bonding portion C2 is connected to a joint 22J. A bonding portion C3 is connected to the joint J11.

FIG. 10 is a diagram illustrating an example of a schematic structure of the parallel link mechanism 21 and connection mechanism 22 that are assembled. In a state where each portion of the plate-shaped member P1 and the plate-shaped member P2 are bent, the bonding portions C1 to C3 of each of the plate-shaped member P1 and the plate-shaped member P2 are bonded to each other. In this example, the bonding portion C1, the bonding portion C2, and the bonding portion C3 of the plate-shaped member P1 are bonded to the bonding portion C1, the bonding portion C2, and the bonding portion C3 of the plate-shaped member P2, respectively, in a state where the bonding portions C1, C2, and C3 are in surface contact with each other. The bonding means is not particularly limited. For example, an adhesive agent or the like may be used.

6. EXEMPLARY EFFECTS

The support arm device 20 including the parallel link mechanism 21 and the connection mechanism 22 as described above is specified as follows, for example. As described with reference to FIG. 7, FIG. 8, and others, the support arm device 20 includes the bendable plate-shaped members forming the parallel link mechanism 21 and the connection mechanism 22, the bent portions (joint portions) of the plate-shaped members function as joints, and a portion (link portion) connecting bent portions in the plate-shaped members functions as a link.

Also in the support arm device 20, as described above, the surgical tool T can be linearly moved in the insertion direction from the base of the parallel link mechanism 21 in which the rotationally driven joint J1-1 is disposed by using the transformation of the connection mechanism 22. In addition, the thickness of the links can be reduced by using the plate-shaped members. Accordingly, for example, the operating area of the parallel link mechanism 21 expands. It is also possible to reduce the weight of the entire parallel link mechanism 21 and the entire connection mechanism 22. Since the function of a joint is implemented by a bent portion of the plate-shaped members, it is possible to avoid rattling that may occur in a case where, for example, a bearing or the like. Since no backlash occurs, the control accuracy of the rotational position can be improved accordingly.

A bent portion (joint portion) of the plate-shaped members is elastically transformable, and a portion (link portion) connecting bent portions in the plate-shaped members may have higher rigidity than that of a bent portion. For example, the functions of a joint and a link can be implemented using such plate-shaped members.

As described with reference to FIG. 9, FIG. 10, and others, the plate-shaped members may be a plurality of plate-shaped members (for example, the plate-shaped member P1 and the plate-shaped member P2) in which parts thereof (for example, the bonding portion C1, the bonding portion C2, and the bonding portion C3) are bonded to each other. The parallel link mechanism 21 and the connection mechanism 22 can be easily manufactured only by bonding the plate-shaped members.

Note that the effects described herein are merely examples, and it is not limited to the disclosed content. There may be other effects.

Although the embodiments of the disclosure have been described above, the technical scope of the disclosure is not limited to the above embodiments as they are, and various modifications can be made without departing from the gist of the disclosure. In addition, components of different embodiments and modifications may be combined as appropriate.

Note that the present technology can also have the following structures.

REFERENCE SIGNS LIST

1 ROBOT SYSTEM
2 ROBOT DEVICE
3 MONITOR

4 BASE PORTION
MC MICROSCOPE
E EYEBALL
RCM REMOTE CENTER OF MOTION (FIXED POINT IN PIVOT ROTATION)
R1 ROBOT
R2 ROBOT
R3 ROBOT
T SURGICAL TOOL
U USER
20 SUPPORT ARM DEVICE
21 PARALLEL LINK MECHANISM
22 CONNECTION MECHANISM
22J JOINT
22L1 LINK
22L2 LINK
22A CONNECTION MECHANISM
22AJ1 JOINT
22AL1 LINK
22AL2 LINK
22AL3 LINK
22AJ3 JOINT
22AL4 LINK
22B CONNECTION MECHANISM
22C CONNECTION MECHANISM
23 SUPPORT MEMBER
C1 BONDING PORTION
C2 BONDING PORTION
C3 BONDING PORTION
J1 JOINT
J2 JOINT
J3 JOINT
J4 JOINT
J5 JOINT
J6 JOINT
J7 JOINT
J8 JOINT
J9 JOINT
J10 JOINT
J11 JOINT
J12 JOINT
L12 LINK
L13 LINK
L24 LINK
L34 LINK
L35 LINK
L46 LINK
L57 LINK
L58 LINK
L79 LINK
L89 LINK
L1011 LINK
L1112 LINK
P1 PLATE-SHAPED MEMBER
P2 PLATE-SHAPED MEMBER

The invention claimed is:

1. A support arm device, comprising:
a parallel link mechanism extending in a plane direction of a first plane; and
a connection mechanism connected to the parallel link mechanism, wherein the parallel link mechanism includes:
a support link that supports, on a distal end side, a surgical tool to be inserted into a body of a patient;
an opposing link facing the support link;
a first joint connected to a first end of the opposing link;
a second joint connected to a second end of the opposing link; and
a third joint disposed at a base, wherein
the base is an end on a side opposite to the distal end side,
the third joint is rotationally driven,
the connection mechanism is connected between the second joint and the third joint, and
the connection mechanism includes a link mechanism configured to move in a plane direction of a second plane intersecting the first plane such that the second joint moves relative to the third joint in an extending direction of the opposing link.

2. The support arm device according to claim 1, wherein the link mechanism of the connection mechanism is moved in the second plane such that the first joint, the second joint, the third joint, and the connection mechanism are positioned on the second plane.

3. The support arm device according to claim 1, wherein the second plane is orthogonal to the first plane.

4. The support arm device according to claim 1, wherein the link mechanism is moved to have a V-shape on the second plane.

5. The support arm device according to claim 1, wherein the link mechanism is moved to have a plurality of V-shapes on the second plane.

6. The support arm device according to claim 1, wherein the connection mechanism includes an elastic body that is moved to have a U-shape on the second plane.

7. The support arm device according to claim 1, wherein the connection mechanism includes an elastic body that is moved to spiral one or more times on the second plane.

8. The support arm device according to claim 1, wherein the surgical tool is inserted into an eyeball of the patient.

9. The support arm device according to claim 1, wherein the connection mechanism includes an elastic body that is elastic on the second plane.

10. The support arm device according to claim 9, wherein the elastic body includes a leaf spring.

11. The support arm device according to claim 1, further comprising a bendable plate-shaped member that forms the parallel link mechanism and the connection mechanism, wherein
a bent portion of the bendable plate-shaped member functions as a joint, and
a portion connecting bent portions in the bendable plate-shaped member functions as a link.

12. The support arm device according to claim 11, wherein
the bent portion of the bendable plate-shaped member is elastic, and
the portion connecting the bent portions of the bendable plate-shaped member has higher rigidity than rigidity of the bent portions.

13. The support arm device according to claim 11, wherein
the bendable plate-shaped member includes a plurality of plate-shaped members, and
a first plate-shaped member of the plurality of plate-shaped members is partially bonded to a second plate-shaped member of the plurality of plate-shaped members.

14. A robot device, comprising:
a first robot including a base portion and a distal end portion; and
a second robot supported by the distal end portion of the first robot, wherein the second robot supports a surgical tool to be inserted into a body of a patient such that the surgical tool has a remote center of motion, and the second robot includes:

a parallel link mechanism extending in a plane direction of a first plane; and a connection mechanism connected to the parallel link mechanism, wherein the parallel link mechanism includes:

a support link that supports, on a distal end side, the surgical tool to be inserted into the body of the patient;

an opposing link facing the support link;

a first joint connected to a first end of the opposing link;

a second joint connected to a second end of the opposing link; and a third joint disposed at a base, wherein the base is an end on a side opposite to the distal end side, the third joint is rotationally driven, the connection mechanism is connected between the second joint and the third joint, and the connection mechanism includes a link mechanism configured to move in a plane direction of a second plane intersecting the first plane such that the second joint moves relative to the third joint in an extending direction of the opposing link.

* * * * *